United States Patent [19]

Barton et al.

[11] 4,204,791
[45] May 27, 1980

[54] BALE ALIGNMENT DEVICE

[75] Inventors: Lester C. Barton; Gene R. Butler; L. Dennis Butler, all of Kingsburg, Calif.

[73] Assignee: Sperry Rand Corporation, New Holland, Pa.

[21] Appl. No.: 933,242

[22] Filed: Aug. 14, 1978

[51] Int. Cl.² .............................................. B65G 57/32
[52] U.S. Cl. ....................................... 414/36; 414/40; 414/60; 414/501
[58] Field of Search ...................... 414/38, 39, 40, 36, 414/60, 68, 501, 44; 198/418, 434; 271/233

[56] References Cited

U.S. PATENT DOCUMENTS

| | | | |
|---|---|---|---|
| 2,785,785 | 3/1957 | Macaluso | 198/466 |
| 3,289,859 | 12/1966 | Tarbox | 414/40 |
| 3,549,023 | 12/1970 | Backman | 414/40 |
| 3,724,684 | 4/1973 | Butler et al. | 414/40 |
| 3,920,133 | 11/1975 | Butler et al. | 414/39 |
| 4,022,333 | 5/1977 | Haugen | 414/60 |
| 4,088,231 | 5/1978 | Zipser et al. | 414/38 |

*Primary Examiner*—L. J. Paperner
*Attorney, Agent, or Firm*—Shlesinger, Arkwright, Garvey and Dinsmore

[57] ABSTRACT

The bale row forming table of a three table type bale wagon has a bale alignment device cooperating therewith which acts to insure bale tiers of uniform dimensions by establishing bale rows of equal length, an effect achieved by monitoring the length of a bale row by means of trip levers located at the loading end of the table and at the end remote from the loading end and reversing the table conveyor whenever a short bale row is detected to reposition the last bale of the row.

6 Claims, 14 Drawing Figures

BALE ALIGNMENT DEVICE

CROSS REFERENCES TO RELATED APPLICATIONS

Reference is hereby made to the following copending U.S. applications dealing with related subject-matter and assigned to the assignee of the present invention:
1. "Bale Alignment Mechanism Actuating Device" by Edward J. Wynn and Cal L. Bryant, Ser. No. 933,243 filed Aug. 14, 1978.
2. "Automatic Bale Wagon Control System" by Edward J. Wynn and Cal L. Bryant, Ser. No. 933,233 filed Aug. 14, 1978.

BACKGROUND OF THE INVENTION

The present invention relates to bale wagons and an improved bale alignment device for use therewith.

Over the past years, the three-table bale wagon, such as that disclosed in U.S. Pat. No. 2,848,127 to G. E. Grey, an improved version of which is disclosed in U.S. Pat. No. 3,945,507 to J. A. Olsen and L. D. Butler, has become by far the most successful commercial bale wagon. The Grey bale wagon includes three tandemly arranged tables, each pivotally mounted about a transverse axis relative to the longitudinal center line of the wagon. Bales of hay are picked up from the field and conveyed onto a first table which arranges them end to end in a row and pivots upwardly about its transverse axis to deposit the bale rows on a rearwardly disposed second table. The first table continues to receive bales and to deposit the bales received on the second table until a tier of bales has been accumulated on the second table. Once a full tier of bales consisting of a plurality of rows has been accumulated on the second table, the second table is pivoted upwardly about its transverse axis, causing the tier of bales to be deposited on a rearwardly disposed third table or load bed. The second table continues to function as a bale tier former, and continues to deposit the tiers formed thereon in succession on the third table until a stack of bales is formed thereon, the stack being comprised, of course, of a series of side by side tiers. Once the stack has been formed on the third table, the bale wagon can then deposit the entire stack on the ground or on some other storage surface by pivoting the third table about a transverse axis, allowing the stack to be disposed in a generally upright manner on the ground or in a storage area.

Stacking has become a very important function of a bale wagon. To a significant degree, the overall performance of a bale wagon and specifically the quality of the stack and its ability to stand over long periods of time and to be retrieved readily depends on the bales being of uniform shape and having relatively constant dimensions. In this regard, the three table Grey type bale wagon includes a trip lever adjacent one end of the first table opposite the pickup. The purpose of the trip lever is to actuate the first table when the outermost end of the first bale received engages the trip lever, causing the first table to pivot upwardly depositing the bales thereon on the front portion of the second table. Because of this all of the bales along the trip side of the bale wagon are in very good alignment. But should the bale wagon pick up some short bales of less length than the standard length, and these bales are placed on the first table as far toward the first table trip arm as possible, it follows that the first table cycles without regard to the alignment of the bales on the loading side of the bale wagon. The net result is that the side of the stack opposite the trip arm side becomes very jagged and is not properly aligned.

Short bales pose an additional problem with regard to the tier forming capability of the second table. In order to enhance the stability of the stack, it is generally desirable to provide one or more tie tiers within the stack, such being tiers having individual bales arranged to overlap two bales in adjacent tiers above and below the tie tier, an effect achieved by rotating selected bales 90° after they are loaded on the second table. The rotation is achieved by engaging bales disposed along the forward end of the second table with spikes towards their outside ends thus pinning each bale toward one end while subsequent bales are added toward the center of the second table. The unpinned ends of the bales are forced backward along the table while the bales rotate about their respective spikes. This operation would be handicapped by short bales which, being placed on the first table as far toward the trip side as possible, could result in the bale on the loading side missing the tie forming spike after being transferred on the second table.

It will be appreciated that as long as all of the bales are of constant length these problems do not present themselves.

The problem of short and long bales has continued to exist with hay balers for some time, although there has been substantial work done in the area of making a bale with precise dimensions each and every time a bale is baled in the hay baler. But because of so many variables and the general biological nature of crop material with the fact that any mechanism devised must not be overly complex or expensive, it appears that there will not soon be a solution to the problem of making bales of uniform length.

One solution to the problem of dealing with non-uniform bale length was proposed in U.S. Pat. No. 3,724,684 to G. R. Butler and G. L. Sipe, which discloses bale relocater mechanisms for use with the first and second tables of the three table Grey bale wagon. These relocater mechanisms act to move the last bale of each bale row back toward the loading side of the wagon against a fixed fence which serves to align the bales. The relocater mechanism for the first table is activated every time the first table pivots upwardly and imparts an equal lateral motion to each bale it engages. The lateral distance traveled by each bale back toward the loading side of the wagon is determined by the length and position of each bale which affects whether that bale will travel a greater or less distance before contacting the fixed fence.

SUMMARY OF THE INVENTION

It is therefore an object of this invention to provide a bale alignment device for a bale wagon for repositioning bales thereon which cooperates with a bale stack forming mechanism in aligning the sides of a bale stack evenly.

A more particular object of the invention is to provide a bale alignment device for a three table bale wagon which cooperates with the first table thereof to produce bale rows of equal length by repositioning bales so that the dimensions of all the bale tiers are constant thereby giving rise to a sturdy, well formed stack that will stand up in a storage area without tumbling apart and falling to the ground.

Another object of the invention is to provide a bale alignment device for a bale wagon having a tie spike mechanism as part of its second table to correctly space bales of unequal length while on the first table to insure that the bales when transferred to the second table can be engaged by the spikes as required.

A further object of the invention is to provide a first table alignment device which utilizes a trip lever at the bale loading end of the first table to regulate the operation of the bale alignment device.

Another object of the invention is to provide a bale alignment device which utilizes the conveyor system of the bale wagon first table.

A more particular object of the invention is to provide a bale alignment device which acts to reverse the first table conveyor when sensing a short bale row to move the last bale of the row back toward the bale loading end of the first table.

A further object of the invention is to provide a bale alignment device which is selectively responsive to the length of each bale row functioning only when a short row is encountered and only to the extent necessary to correctly adjust the bale positions.

These objects are achieved by a bale alignment device for use with a bale wagon table which receives a plurality of bales in a row thereon and comprises a conveyor for moving the bales along the table, means for determining when the first bale received on the table reaches a predetermined point and means responsive to the overall length of the bale row when the first bale reaches the predetermined point for reversing the conveyor to reposition the last bale of the row when a short row is encountered. The reversing means includes an actuating lever positioned at the bale-receiving end of the table having means associated therewith for permitting the lever to be displaced from a rest position when contacted by a bale and for returning the lever to the rest position when the bale is removed. The reversing means also includes means interconnecting the lever with the table transfer mechanism for permitting operation of the transfer mechanism when the lever is displaced from the rest position and for preventing operation of the transfer mechanism and reversing the conveyor when said lever is in the rest position. More particularly, the lever is pivotally mounted about an axis situated below the plane of the table and extends above the level of the table with a substantially vertical rest position. The lever pivots in the direction of travel of the table conveyor in a plane substantially perpendicular to the plane of the table.

DETAILED DESCRIPTION OF THE INVENTION

In the following description, right hand and left hand references are determined by standing at the rear of the machine and looking forward.

Figure 1:
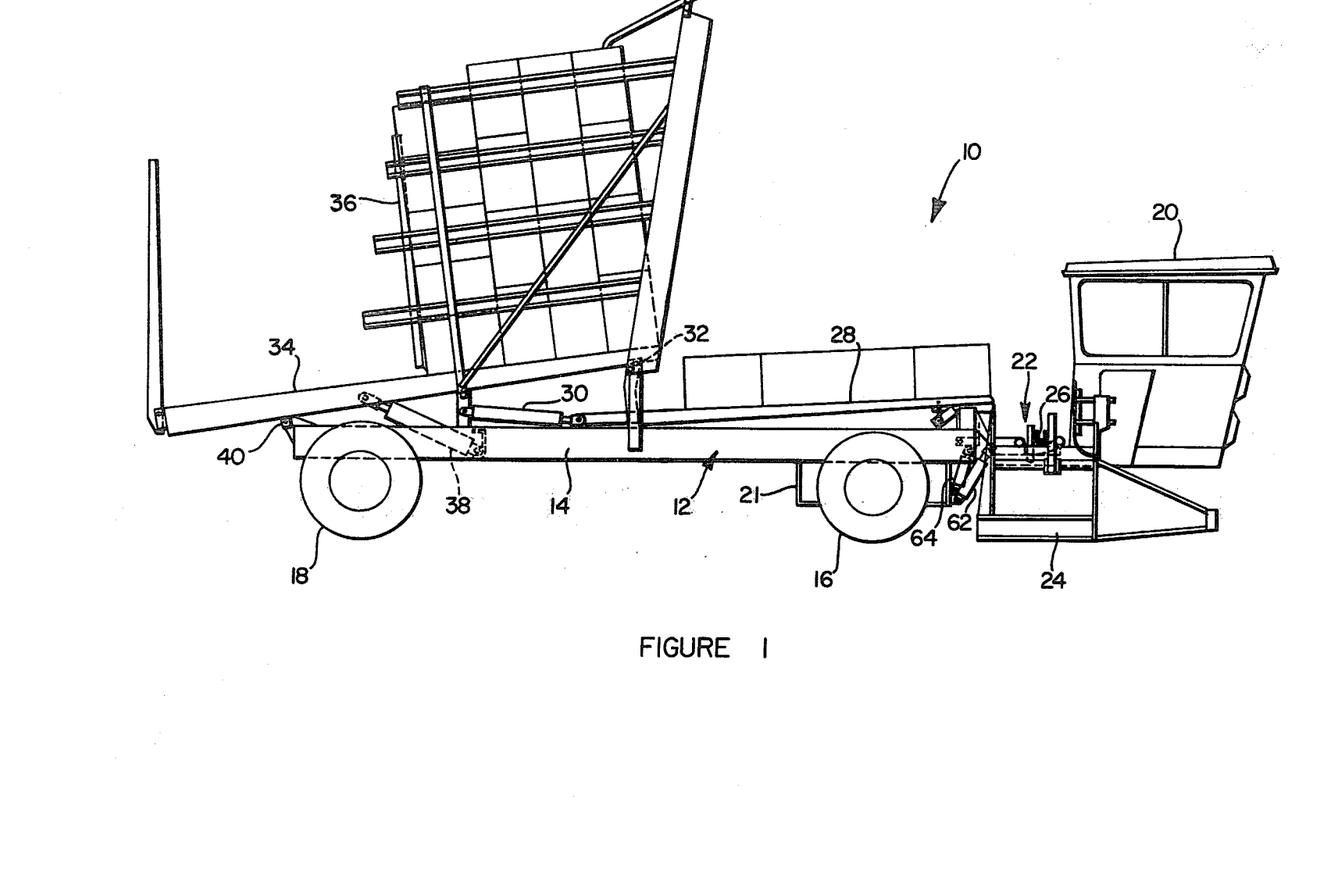
FIG. 1 is a side elevational view of a bale wagon having the present invention, showing the bale wagon with a partially formed block-type stack of bales on its third table and during formation of a tier of bales on its second table.

FIG. 1 shows a bale wagon 10 of the three table type the various elements and the functioning of which are more fully discussed in U.S. Pat. No. 3,945,507, the disclosure of which is herein incorporated by reference. The bale wagon 10 is provided with a mobile chassis, indicated generally as 12, formed of left and right longitudinally extending channels 14, suitably interconnected by spaced transverse channels (not shown), and front and rear wheels 16, 18 for movably supporting the interconnected channels 14. On the forward ends of the channels 14 a cab 20 is mounted for housing the operator and various controls for the wagon. A source of power, such as an engine (not shown) is suitably mounted on the chassis 12 within a support structure 21 fixed between the channels 14 for driving, preferably, the rear pair of wheels 18. Although the wagon illustrated is a self-propelled type, it could readily taken the form of a pull-type wagon with the forward ends of the channels 14, instead of mounting the cab 20, converging in an assembly which would adapt the wagon to be secured to a tractor, or other towing vehicle, located at the front of the wagon.

Mounted near the forward end of the mobile chassis 12, immediately behind the cab 20, and extending transversely thereto, is the first, bale-receiving or bale row forming table 22 of the wagon 10. The bales are first introduced to the first table 22 by means of a bale loader or pick-up, generally indicated at 24, which is mounted to the chassis 12 at the right hand of the table 22 and operates to lift bales from the ground and direct them through a generally 90° arcuate lateral path to the right receiving or loading end of the table 22. A cross conveyor 26 is operatively mounted to the chassis 12 and longitudinally extends along the first table 22 from approximately the right receiving end to near the middle thereof for moving the bales longitudinally along the table 22 from the loader 24 toward the left end of the first table 22. The first table 22 thus functions to form a row of bales thereon end to end in abutting relationship. While this description is generally directed to a two bale row, the bale wagon 10 may be adapted for use with bale rows of different numbers.

Positioned along and generally above the rear longitudinal side of the first table 22 is the second or tier-forming table 28 of the bale wagon 10 which receives bales from the first table 22 and accumulates them forming them into a bale tier. The second table 28 is shown in its normal horizontal tier-forming position. When the requisite number of bales have been accumulated and formed on the second table 28 in a suitable manner into either a standard tier pattern, or one of several tie tier patterns, a hydraulic cylinder 30 is actuated so as to extend and cause the table 28 to swing or pivot upwardly generally 90° about a pivot point 32 to a generally vertical position adjacent the front end of the third table or load bed 34 upon which the bale tiers are accumulated into a bale stack. A stack of bales is progressively formed on the third table 34 upon successive delivery thereto of tiers of bales by pivotal movement of the second table 28 from its normal horizontal tier-forming position to its generally upright position adjacent the forward end of the third table 34. As the first tier of bales is delivered or deposited onto the third table 34, a rolling rack 36, longitudinally moveable rearward along the third table 34 by the load being formed and forward by a hydraulic cylinder (not shown), is contacted by the tier and forced to move rearwardly along the third table 34 against the residual holding pressure of the hydraulic cylinder.

When the third table 34 has been loaded with the desired number of tiers, the stack can be transferred to the ground in the form of a composite stack by extension of the hydraulic cylinder 38 which causes the third table 34 to pivot generally 90° about point 40 from the generally horizontal position of FIG. 1 to an upright position in which the rolling rack 36 and the rear end of the third table 34 are disposed adjacent the ground.

Figure 2:
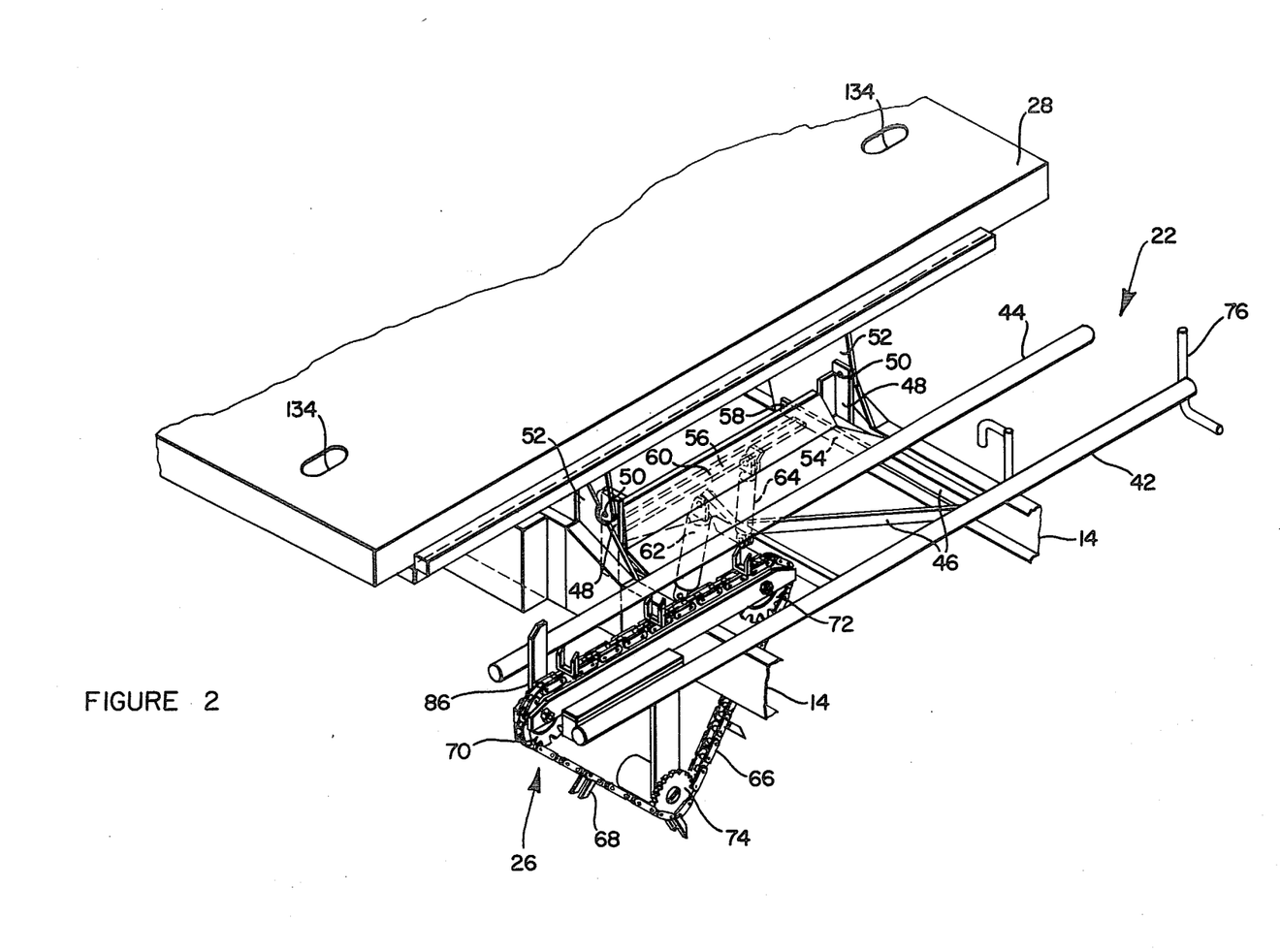
FIG. 2 is an enlarged fragmentary perspective view of the first table of the bale wagon of FIG. 1 having the bale alignment device of the present invention.

The first table 22 of the bale wagon 10 is illustrated in greater detail in FIG. 2 and comprises two parallel transversely-extending and spaced-apart front and rear beams 42, 44. Front beam 42 is mounted on forwardly extending horizontal members 46 of an L-shaped structure which also includes rear upwardly extending leg portions 48 which are pivotally secured at 50 to brackets 52 mounted on the longitudinal channels 14. The front transverse beam 42 supports the bales received on the first table 22 on one side of each bale at a location remote from the second table 28. The rear transverse beam 44 supports the bales received on the first table 22 at a location near the second table 28. Rear transverse beam 44 is mounted on the forward ends of a pair of spaced apart arms 54 which are interconnected by a brace 56. The rear ends of the arms 54 are pivotally secured at 58 between the upstanding brackets 52 generally below, inwardly from, and rearwardly of, the pivotal securement of upwardly extending leg portions 48 at 50 to the brackets 52. A shield piece 60 is fixed across the arms 54 rearwardly of the beam 44 for helping to prevent the flow of crop material from the bales received on the first table 22 to under the front end of the second table 28 where the engine for the bale wagon 10 is preferably located on support structure 21.

First and second hydraulic cylinders 62, 64 are pivotally secured at their anchor ends to the forward side of the engine support structure 21 and are pivotally secured at their rod ends to the horizontal members 46 connected to front beam 42 and to the brace 56 connected to the rear beam 44 respectively. Bales are transferred from the first table 22 to the second table 28 by activating the first hydraulic cylinder 62 which extends and swings or pivots the front beam 42 upwardly about its pivotal point 50 in a counter-clockwise direction to a generally vertical, bale-discharging position adjacent the second table 28. The second beam 44, due to the overlapping relationship of the beam 44 and the forwardly extending horizontal members 46, will be carried to its upper position by the action of hydraulic cylinder 62. The second beam 44 operates independently by means of its hydraulic cylinder 64 in a special mode for changing the side upon which a bale will be deposited on the second table 28. This special mode action of the first table 22 does not form a part of the present invention and is completely discussed in the aforementioned U.S. Pat. No. 3,945,507.

Positioned between the front and rear beams 42, 44 toward the bale receiving end of table 22 is a conveyor 26 situated parallel to the front and rear beams 42, 44 for the purpose of conveying bales longitudinally on the table 22. The conveyor 26 comprises a chain 66 having bale-engaging teeth 68 located at intervals thereon. The chain 66 travels in a continuous path about sprocket wheels 70, 72, 74. The conveyor 26 extends from approximately the right receiving end of the table 22 to near the middle thereof. A bale lifted from the ground and directed through a generally 90° arcuate lateral path by the bale loader 24 is dropped onto the first table 22 at the bale receiving end thereof where it is engaged by the teeth 68 of the conveyor 26. The bale is moved along the table 22 by the conveyor 26 until past the point where it can no longer be engaged by the teeth 68. The next bale on the table 22 is similarly engaged by the conveyor 26 and moved longitudinally along the table 22. Upon contact with the first bale the second bale still engaged by the conveyor 26 will push the first bale farther toward the end of the first table 22 remote from the bale receiving end. Positioned at the end of the table 22 remote from the bale receiving end is a trip lever 76 which lies in the bale path. When the first bale reaches a predetermined point set by adjusting the longitudinal position of the trip lever 76 the bale will engage the trip lever 76 thus activating the transfer mechanism of the first table 22 to pivot the first table 22 upward and deposit the two bales on the forward portion of the second table 28.

Figure 3:
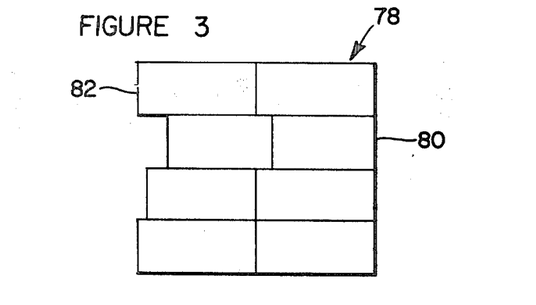
FIGS. 3 and 4 are diagrammatic views of bale tiers containing short bales.

The trip lever 76 is set at a predetermined longitudinal point along the first table 22 based on the normal length of the bales to be loaded and no problems are encountered as long as the bales are in fact of the normal length. However short bales can be encountered which, due to the manner in which the first table conveyor 26 operates so as to position bales end to end in abutting relationship as far as possible toward the end of the first table remote from the bale receiving end, will result in a bale stack 78 as depicted in FIG. 3. The bale stack 78 has one side 80 in alignment due to the fact that the first bale of each row on table 22 is at the same position when the trip lever 76 is engaged. However the opposite side 82 of the bale stack is out of alignment due to the action of the conveyor 26 which regardless of the length of the bales moves them as far as possible away from the bale receiving end of the table 22 thus resulting in an unsightly and unstable bale stack.

Figure 4:
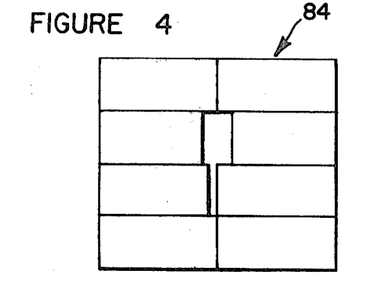
Figure 5:
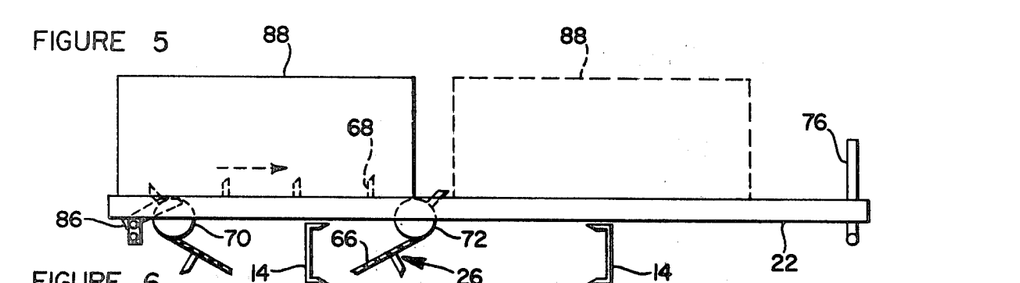
FIGS. 5, 6, 7 and 8 are diagrammatic views of a bale wagon first table with the bale alignment mechanism of the present invention showing the table in successive stages of operation.

To avoid the situation so as to produce a more stable bale stack 84 as shown in FIG. 4 having all sides in alignment, a second trip lever 86 is positioned at or adjacent the bale receiving end of the table 22. The lever 86 is pivotally mounted about an axis situated below the plane of the table 22 with its upper portion projecting above the plane of the table 22 so as to lie in the path of any bales on the table 22. The lever 86 pivots in a longitudinal direction with respect to the table 22 which is also the direction of travel of the conveyor 26 and may pivot either toward the bale receiving end of the table 22 or toward the end remote from the bale receiving end. The plane in which the lever 86 pivots is substantially perpendicular to the plane of the table 22. The lever 86 has a substantially vertical rest position and has connected therewith a spring system or other suitable mechanism which permits the lever 86 to be displaced in either longitudinal direction along said table from its rest position when contacted by a bale and returns the lever 86 to the rest position when the bale is removed. The lever 86 may be cylindrical in shape or rectangular. If rectangular the lever 86 may have a triangular segment removed from the upper portion thereof so as to present a sloped surface toward the bale receiving end of the table 22.

Figure 6:
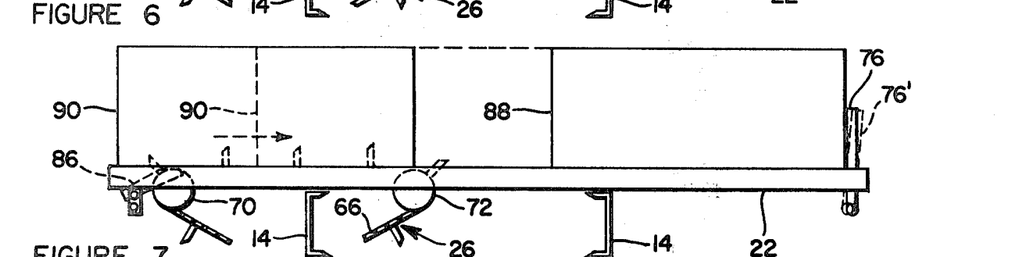
Figure 7:
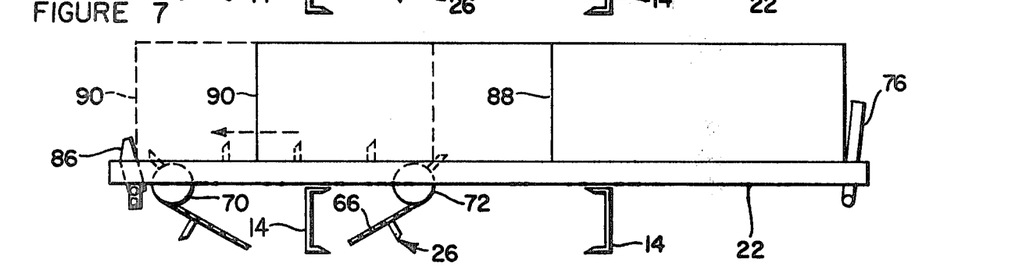
Figure 8:
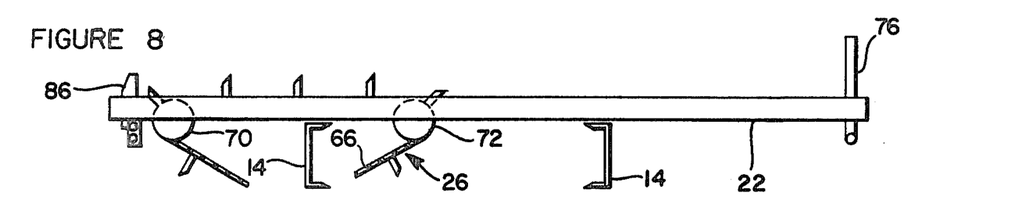

With reference to FIGS. 5–8, two equally short bales 88, 90 are loaded on the first table 22. The first short bale 88 is loaded on the bale receiving end of the table 22 and conveyed by the conveyor 26 toward the end of the table 22 remote from the bale receiving end until out of engagement with the teeth 68. When at the bale receiving end of the table 22 the bale 88 displaces the lever 86 away from the bale receiving end but upon movement along the table 22 the bale 88 moves out of contact with lever 86 which thereupon returns to its substantially vertical rest position. The second and, in the case of a two bale row, last bale 90 to be loaded on the table 22 also displaces the lever 86 at first. As shown in FIG. 6, the bale 90 is moved by the conveyor 26 toward the end of the table 22 remote from the bale receiving end and in doing so contacts the end of bale 88 so that both bales are moved toward the trip lever 76. After the bale 90 has moved a certain distance the lever 86 springs back to its substantially vertical position. The lever 86 is hydraulically interconnected with the first table transfer mechanism and with the hydraulic motor powering the conveyor 26. When the lever 86 is displaced longitudinally either toward or away from the bale receiving end of the table 22, it will permit the table transfer mechanism to operate in a normal manner when the trip lever 76 is engaged. However, if the lever 86 is in its substantially vertical rest position, the lever 86 will prevent operation of the first table transfer mechanism and will reverse the direction of the conveyor 26. The longitudinal position of the lever 86 along the table 22 may be adjusted according to the normal size of the bales to be loaded. If both bales loaded on the table 22 are of normal length, the second bale on the table will still be holding the lever 86 in a position displaced longitudinally away from the bale receiving end of the table when the leading edge of the first bale trips the lever 76. Since the lever 86 remains displaced at this time, the transfer mechanism of the table 22 is activated and transfers the two bales to the forward portion of the table 28. However, if either one or both of the bales loaded on the table 22 is shorter than normal, the last bale 90 on the table 22 will move longitudinally along the table 22 past a point where the lever 86 will remain displaced whereupon it will return to its substantially vertical rest position. Thus when the leading edge of the bale 88 which is being moved along the table 22 by the bale 90 reaches the point where it trips the lever 76, the lever 86 will be in its rest position. As a result the transfer mechanism of the table 22 will not be activated and the conveyor 26 will be reversed whereupon the bale 90 will be moved back toward the bale receiving end of the table 22 while the bale 88 which is no longer engaged by the conveyor 26 will remain in position on table 22 against the trip lever 76. The bale 90 will continue back along the table 22 until it engages and displaces the lever 86 toward the bale receiving end of the table 22. Once the bale 90 reaches this predetermined point adjacent the bale receiving end of the table 22 set by the longitudinal position of the lever 86, the transfer mechanism of the first table is activated since both the levers 76 and 86 are in their displaced positions. The bales 88, 90 therefore are transferred to the second table 28 of the bale wagon 10 with their respective outside edges in alignment with the outside edges of bale rows having bales of normal length. Thus the levers 76 and 86 and their interaction with the transfer mechanism and the conveyor 26 of the table 22 cooperate to sense the actual length of a bale row and reposition the bales of any row found to be shorter than normal.

Figures 9, 10, 11, 12, 13, 14:
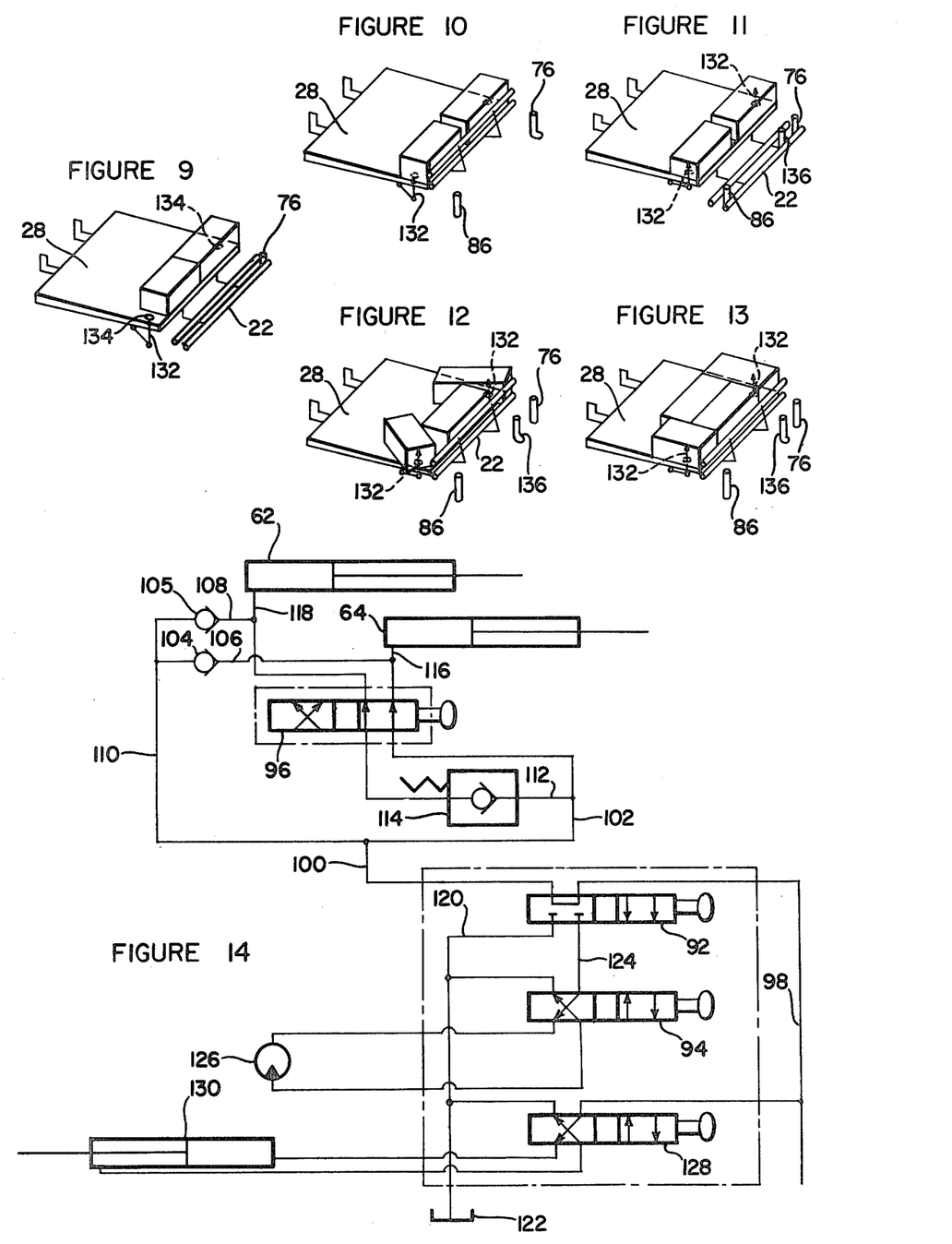
FIG. 9 is a diagrammatic view of the first and second tables of a bale wagon with two bales on the second table loaded thereon without the use of the alignment device of the present invention.
FIGS. 10, 11, 12 and 13 are diagrammatic views of the initial steps in the formation of bales into a tie tier.
FIG. 14 is a diagrammatic representation of the hydraulic system used for operation of the first table.

Referring to FIG. 14 there is shown the hydraulic system interconnecting the transfer mechanism of table 22 with the transfer mechanism actuating trip lever 76, the bale receiving end trip lever 86 and the conveyor 26. The hydraulic system includes a first table transfer valve 92, a conveyor direction valve 94 and a first table mode valve 96. When the spool of valve 92 is in the "out" position as shown in FIG. 14, hydraulic fluid under pressure from a pump (not shown) via line 98 passes through the valve 92 to line 100 where it enters the hydraulic portion of the transfer mechanism of the first table 22. The hydraulic fluid flows under pressure to line 102. The presence of one-way check valves 104, 105 in branch lines 106, 108 of the line 110 prevents flow in these lines from line 100 to the cylinders 62, 64. A flow line 112 is provided interconnecting flow line 102 with one path in each of the two pairs of flow paths through the valve 96. A relief valve 114 is connected in the line 112 which will normally prevent the flow of fluid from line 100 to enter line 112 to the valve 96 until a predetermined level of line pressure is reached. Such a level is above the level of pressure needed to extend the second hydraulic cylinder 64. Thus, when the mode selection valve 96 is at its "in" position as shown in FIG. 14 for operation of the second beam 44 of the first table 22 independently in its special mode, the flow of fluid initially proceeds through valve 96 to the second cylinder 64 via line 116 to cause extension thereof. Once the cylinder 64 has fully extended, a level of pressure is almost instantaneously reached which overcomes the spring bias of relief valve 114, whereby the flow of fluid proceeds in line 112 through valve 96 to the first cylinder 62 via line 118 to cause extension thereof. When the cylinder 62 has fully extended with the first table 22 pivoted to its upper vertical position, a suitable mechanical linkage is tripped which moves the spool of valve 92 to its "in" position, allowing the transfer mechanism to return to its lower position with release of the hydraulic pressure via line 120 to the tank 122. If the mode selection valve 96 had been at its "out" position for operation of first table 22 in its normal mode, the flow of fluid would have proceeded from line 102 through valve 96 to cylinder 62 via line 118 to cause extension thereof. Once the cylinder 62 had fully extended, the same aforementioned linkage would move the spool of the valve 92 to its "in" position. The two mode operation of the first table 22 is more fully discussed in the aforementioned U.S. Pat. No. 3,945,507.

When the spool of the valve 92 is in the "in" position the hydraulic fluid under pressure from line 98 is fed via line 124 to the conveyor direction hydraulic valve 94 and from there to conveyor hydraulic motor 126. The conveyor 26 operates in either the forward or reversed direction depending on whether the spool of the valve 94 is in the "in" or "out" position. The hydraulic valves 92 and 94 are mechanically interconnected with one another and with the transfer mechanism actuating trip lever 76 and the bale receiving end trip lever 86 so that the spool of valve 92 will be moved from the "in" position to the "out" position only when both the levers 76 and 86 have been displaced and so that, if the lever 76 is displaced while the lever 86 is not, the spool of valve 92 will remain in the "in" position while the spool of the valve 94 will switch positions to change the direction of the conveyor 26 from forward to reverse.

Also shown in FIG. 14 are a hydraulic valve 128 and a hydraulic cylinder 130 which form components of the tie spike mechanism of the bale wagon which is used in the formation of tie tiers. This mechanism and the tie tiers it is used to form are discussed here with regard to their pertinency to the present invention. A fuller discussion thereof can be found in the aforementioned U.S. Pat. No. 3,945,507.

The formation of a tie tier and the action of the tie spike mechanism therein involve the rearrangement of a pair of bales, initially disposed end to end in a row transversely along the forward end of the second table 28, into side rail positions in which the bales are separated from each other and respectively disposed longitudinally along opposite sides of the second table 28 adjacent the forward end thereof. The spikes 132 of the mechanism act to engage each of the respective bales to provide pivot points about which the bales will be rotated. The spikes 132 are positioned perpendicularly with respect to the surface of the second table 28 and below it. Upon activation of the tie spike mechanism, the spikes 132 rise through the openings 134 to engage the bales situated over the openings. In the event that either one or both of the bales in a row were short, the bales would be positioned as far as possible along the table 22 away from the bale receiving end in abutting relationship if an alignment device was not present. If the bales were short enough, the situation depicted in FIG. 9 would result in which the second bale has been placed too far to the left on the first table 22 to be able to be engaged by the right hand spike 132 when the bale is transferred to the second table 28. With an alignment device, however, the bales are placed in proper positions for engaging the spikes 132 as shown in FIG. 10 and the tie spike mechanism of the second table 28 can perform its function properly as shown in FIGS. 10-13.

In FIG. 11 the tie spike mechanism is activated by mechanical means (not shown) which moves the spool of hydraulic valve 128 from one position to the other so as to cause the hydraulic cylinder 130 to extend the spikes 132 upward to engage the bales on the second table 28. Simultaneously the tie forming trip lever 136 which normally rests out of the way is rotated into position on the first table 22 so as to lie in the path of the bales traveling longitudinally along the table 22. Also, the bale receiving end trip lever 86 is deactivated so that, even though not in contact with a bale, it will not prevent the first table transfer mechanism from engaging and will not reverse the conveyor 26. The tie forming trip lever 136 is so positioned longitudinally on said table 22 that, when contacted and tripped by the leading edge of a bale, that bale will be longitudinally centered on the first table 22.

Immediately after the tie spike mechanism is activated, a bale is loaded onto the first table 22 and is conveyed along table 22 by the conveyor 26. Upon contacting the tie forming trip lever 136 the first table transfer mechanism, to which the trip lever 136 is connected, is activated and the single bale is delivered to the forward portion of the second table 28.

Since the two bales already positioned on the second table forward portion are, in effect, pivotally secured at their respective outer ends to the second table 28 by the spikes 132, delivery of the single bale to the center of the forward portion of the second table 28 pushes the respective inner ends of the two bales rearwardly and partially toward rail positions at the respective opposite sides of the second table 28, as seen in FIG. 12.

At the start of the next first table cycle, the spikes 132 and tie forming trip lever 136 still remain at their elevated positions and the right bale receiving end trip lever 86 remains deactivated. Again, the first table transfer mechanism activates upon receiving a single bale and pushes the bale onto the second table 28 and into the single bale already positioned there such that the latter single bale is moved rearwardly and the two partially pivoted bales are moved completely to their rail positions, as seen in FIG. 13.

After completion of this tie forming operation the hydraulic valve 128 is switched and the spikes 132 are lowered and disengaged from their respective bales while the tie forming trip lever 136 is rotated to its deactivated position and the bale receiving end trip lever 86 is reactivated. Finally the second table 28 is rotated about its pivot 32 to move the assembly of four bales to the rear thereof and the process is repeated.

While this invention has been described as having a preferred design, it will be understood that it is capable of further modification. This application, is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

We claim:

1. A bale alignment device for a bale wagon having a table for receiving a plurality of bales thereon in a row prior to transfer to a tier forming means and means for transferring bales from said table to said tier forming means, said bale alignment device, comprising:
    means for conveying the bales along said table from a bale receiving end thereof;
    means for determining when the first bale received on said table reaches a predetermined point remote from said bale receiving end; and
    means responsive to the overall length of the row of bales when the first bale reaches said predetermined point for reversing said conveying means to reposition the last bale on said table toward said bale receiving end when a short row is encountered.

2. The bale alignment device of claim 1 wherein said reversing means includes:
    an actuating lever positioned at said bale receiving end of said table, said lever having a portion lying in the path of any bales on said table;
    said lever having means associated therewith for permitting said lever to be displaced from a rest position when contacted by a bale and for returning to said rest position when the bale is removed; and
    means interconnecting said lever with said transfer means for permitting operation of said transfer means when said lever is displaced from said rest position and for preventing operation of said transfer means and reversing said conveying means when said lever is in said rest position.

3. The bale alignment device of claim 2 wherein said lever is so positioned at said bale receiving end of said table with said portion lying in the path of the bales on said table that said lever will be displaced by a bale when received on said table from a bale loading mechanism and by a bale when being returned toward said bale receiving end of said table by said conveying means.

4. The bale alignment device of claim 1 wherein said reversing means includes:
- an actuating lever positioned at said bale receiving end of said table, said lever being pivotally mounted about an axis situated below the plane of said table and extending above the level of said table with a substantially vertical rest position, said lever pivoting in the direction of travel of said conveying means in a plane substantially perpendicular to the plane of said table and having associated therewith means for returning said lever to said rest position when not in contact with a bale; and
- means interconnecting said lever with said transfer means for permitting operation of said transfer means when said lever is pivoted from said substantially vertical rest position and for preventing operation of said transfer means and reversing said conveying means when said lever is in said substantially vertical rest position.

5. In a bale wagon having a table for receiving a plurality of bales end to end in a row, means disposed along said table for receiving bales therefrom and forming the bales into a tier thereof, and means for transferring the bales from said table to said tier forming means, a bale alignment device, comprising:
- means for conveying the bales along said table from a bale receiving end thereof;
- means responsive to the position of the first bale received on said table for activating said transfer means when the first bale reaches a predetermined point remote from said bale receiving end whereby successive rows of bales may be transferred to said tier forming means with their respective first bales in alignment with one another; and
- means responsive to the overall length of the row of bales when the first bale reaches said predetermined point for preventing activation of said transfer means and for reversing said conveying means to reposition the last bale on said table toward said bale receiving end if a short row is encountered and for permitting operation of said transfer means if a normal length row is encountered whereby successive rows of bales may be transferred to said tier forming means with their respective last bales in alignment with one another.

6. An actuating mechanism for a bale alignment device of a bale wagon, the bale wagon having a table for receiving a plurality of bales thereon in a row prior to transfer to a tier forming means, including a table conveyor for moving bales along the table, and means for transferring bales from the table to the tier forming means, said actuating mechanism comprising:
- a lever positioned at the bale receiving end of the table, said lever being pivotally mounted about an axis situated below the plane of the table and extending above the level of the table with a substantially vertical rest position, said lever pivoting in the direction of travel of the table conveyor in a plane substantially perpendicular to the plane of the table; and
- means interconnecting said lever with the transfer means for permitting operation of the transfer means when said lever is pivoted from said substantially vertical rest position and for preventing operation of the transfer means and reversing the conveyor when said lever is in said substantially vertical rest position.

* * * * *